United States Patent
Kadota et al.

(10) Patent No.: US 6,969,337 B2
(45) Date of Patent: Nov. 29, 2005

(54) VEHICLE DRIVING FORCE CONTROL APPARATUS

(75) Inventors: Keiji Kadota, Zama (JP); Tatsuya Kamata, Atsugi (JP); Yasuaki Iwata, Zama (JP); Kimitaka Nakamura, Shimotsuga-gun (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/641,032

(22) Filed: Aug. 15, 2003

(65) Prior Publication Data

US 2004/0043862 A1 Mar. 4, 2004

(30) Foreign Application Priority Data

Sep. 4, 2002 (JP) ........................... 2002-259157

(51) Int. Cl.$^7$ ............................................. B60K 41/02
(52) U.S. Cl. ................................. 477/5; 477/6; 477/8
(58) Field of Search .................. 477/3, 5, 6, 8, 477/20, 107

(56) References Cited

U.S. PATENT DOCUMENTS

| | | | | | |
|---|---|---|---|---|---|
| 4,351,405 | A | * | 9/1982 | Fields et al. | 180/65.2 |
| 5,899,951 | A | | 5/1999 | Babbel et al. | |
| 6,321,865 | B1 | * | 11/2001 | Kuribayashi et al. | 180/243 |
| 6,434,469 | B1 | | 8/2002 | Shimizu et al. | |
| 6,442,454 | B1 | | 8/2002 | Akiba et al. | |
| 6,601,682 | B2 | * | 8/2003 | Lehmann et al. | 192/55.1 |
| 6,661,109 | B2 | * | 12/2003 | Fukasaku et al. | 290/40 C |
| 2002/0041167 | A1 | | 4/2002 | Kitano et al. | |
| 2003/0010559 | A1 | | 1/2003 | Suzuki | |
| 2003/0064858 | A1 | | 4/2003 | Saeki et al. | |
| 2003/0089539 | A1 | | 5/2003 | Kadota | |
| 2003/0151381 | A1 | | 8/2003 | Kadota et al. | |

FOREIGN PATENT DOCUMENTS

| | | | |
|---|---|---|---|
| DE | 19945449 | * | 3/2000 |
| EP | 1 205 331 A2 | | 5/2002 |
| GB | 2263519 | * | 7/1993 |
| JP | 11-243608 A | | 9/1999 |
| JP | 2001-138764 A | | 5/2001 |
| JP | 2001-263383 | * | 9/2001 |
| JP | 2002-200932 A | | 7/2002 |
| JP | 2002-218605 A | | 8/2002 |
| JP | 2003-025861 A | | 1/2003 |
| JP | 2003-130200 A | | 5/2003 |
| JP | 2003-156079 A | | 5/2003 |
| JP | 2003-209902 A | | 7/2003 |

* cited by examiner

*Primary Examiner*—Ha Ho
(74) *Attorney, Agent, or Firm*—Shinjyu Global IP Counselors, LLP

(57) ABSTRACT

A vehicle driving force control apparatus is provided for a vehicle having an electric motor transmitting a drive torque to a first wheel, and a clutch installed between the electric motor and the first wheel. The vehicle driving force control apparatus basically comprises a clutch control section and a motor control section. The clutch control section is configured to control engagement and release of the clutch. The motor control section is configured to control a motor response characteristic by increasing the motor response characteristic of the motor from a first response characteristic to a second response characteristic when the clutch control section releases the clutch. Preferably, the vehicle driving force control apparatus is configured to cancel insufficient torque generation due to undershoot armature current when controlling armature current of an electric motor and transmitting torque to subordinate drive wheels.

18 Claims, 9 Drawing Sheets

VEHICLE DRIVING FORCE CONTROL APPARATUS

BACKGROUND OF THE INVENTION

1. Field of the Invention

The present invention generally relates to a vehicle driving force control apparatus for a vehicle in which a pair of drive wheels are driven by a drive torque from an electric motor. Preferably, the electric motor is driven with electric power generated by a generator that is driven by an internal combustion engine. The electric motor transmits drive torque to the subordinate wheels by using an electromotive force generated by a generator.

2. Background Information

A vehicle driving force control apparatus is disclosed in Japanese Laid-Open Patent Publication No.11-243608 in which an internal combustion engine drives the front wheels and an electric motor drives the rear wheels. A clutch and a reduction gear are installed in the torque transmission path from the motor up to the rear wheel shaft. The motor is allowed to run idle until the motor rotational speed reaches a speed that is equivalent to the vehicle speed, then the clutch engages while electrical power to the motor is temporarily cut and thereafter the motor restarts and the output torque gradually rises.

In view of the above, it will be apparent to those skilled in the art from this disclosure that there exists a need for an improved vehicle driving force control apparatus. This invention addresses this need in the art as well as other needs, which will become apparent to those skilled in the art from this disclosure.

SUMMARY OF THE INVENTION

It has been discovered that in the above conventional example, an engagement shock that occurs when the clutch engages can be prevented by engaging the clutch when the rotational speed of the motor and the vehicle speed coincide. However, the above conventional example does not consider a shock that occurs when releasing the clutch from an engaged state. When this clutch is released, the rotational speed of the clutch of the electric motor and the rotational speed of the vehicle are equal. In order to generally ensure the stability of control of normal armature current, the control gain is set small. Because of this, there was an unsolved problem in which shock occurs when releasing the clutch due to the armature current undershoots towards the smaller direction resulting an insufficient amount of drive torque of the electric motor when changing from a reduction control that lowers the armature current to a fixed value control that maintains the current at a fixed value.

Thereupon, the object of the present invention is to give attention to the unsolved problems of the above-mentioned conventional example and provide a vehicle driving force control apparatus that can reliably control the armature current without the occurrence of overshoot when changing from a reduction control of the armature current of the electric motor to a fixed value control.

In order to achieve the above-mentioned object, a vehicle driving force control apparatus is provided for a vehicle having an electric motor transmitting a drive torque to a first wheel, and a clutch installed between the electric motor and the first wheel. The vehicle driving force control apparatus basically comprises a clutch control section and a motor control section. The clutch control section is configured to control engagement and release of the clutch. The motor control section is configured to control a motor response characteristic by increasing the motor response characteristic of the motor from a first response characteristic to a second response characteristic when the clutch control section releases the clutch.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
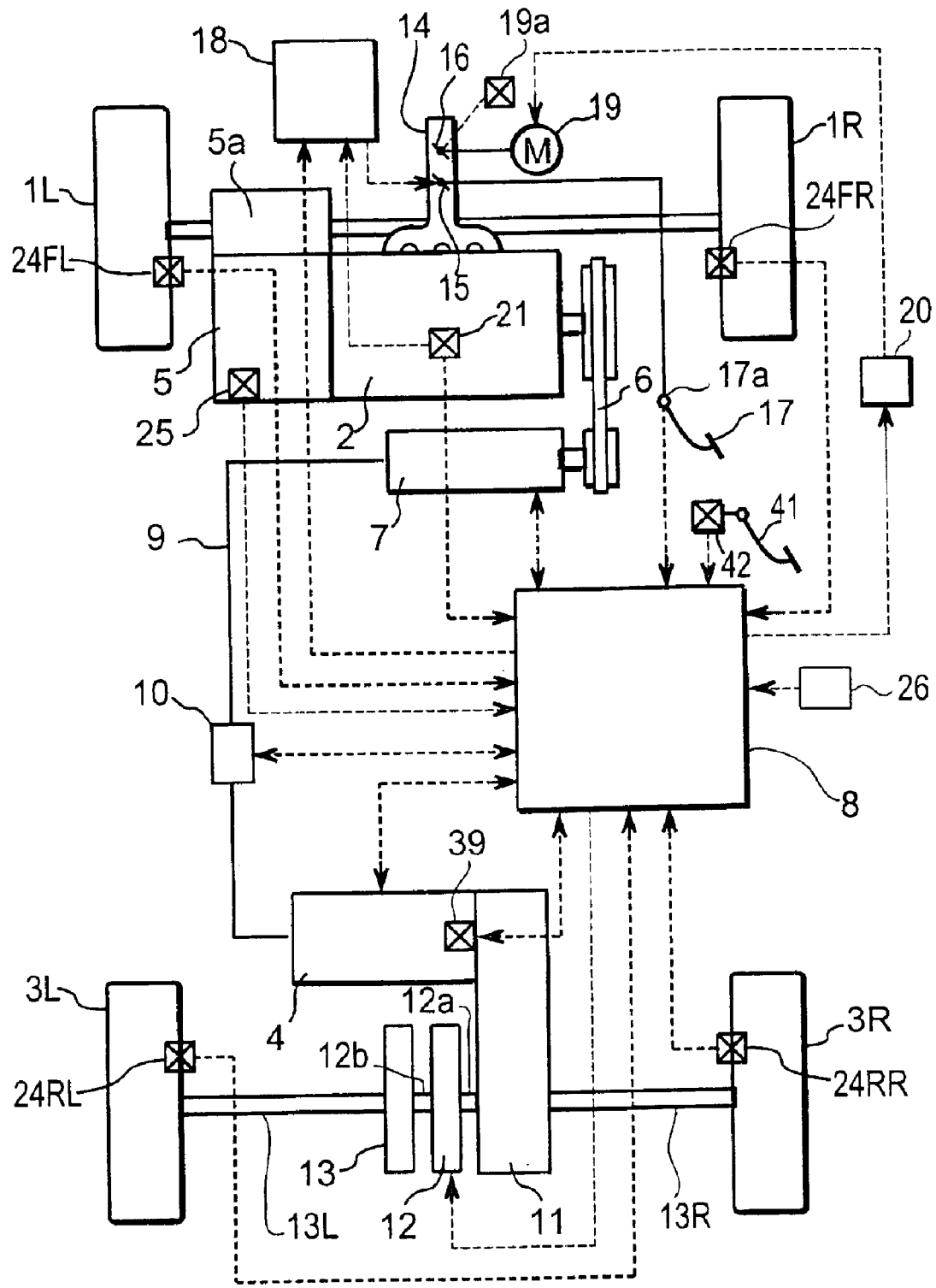
FIG. 1 is a schematic block diagram of a vehicle equipped with a vehicle driving force control apparatus in accordance with preferred embodiments of the present invention;.
Figure 2:
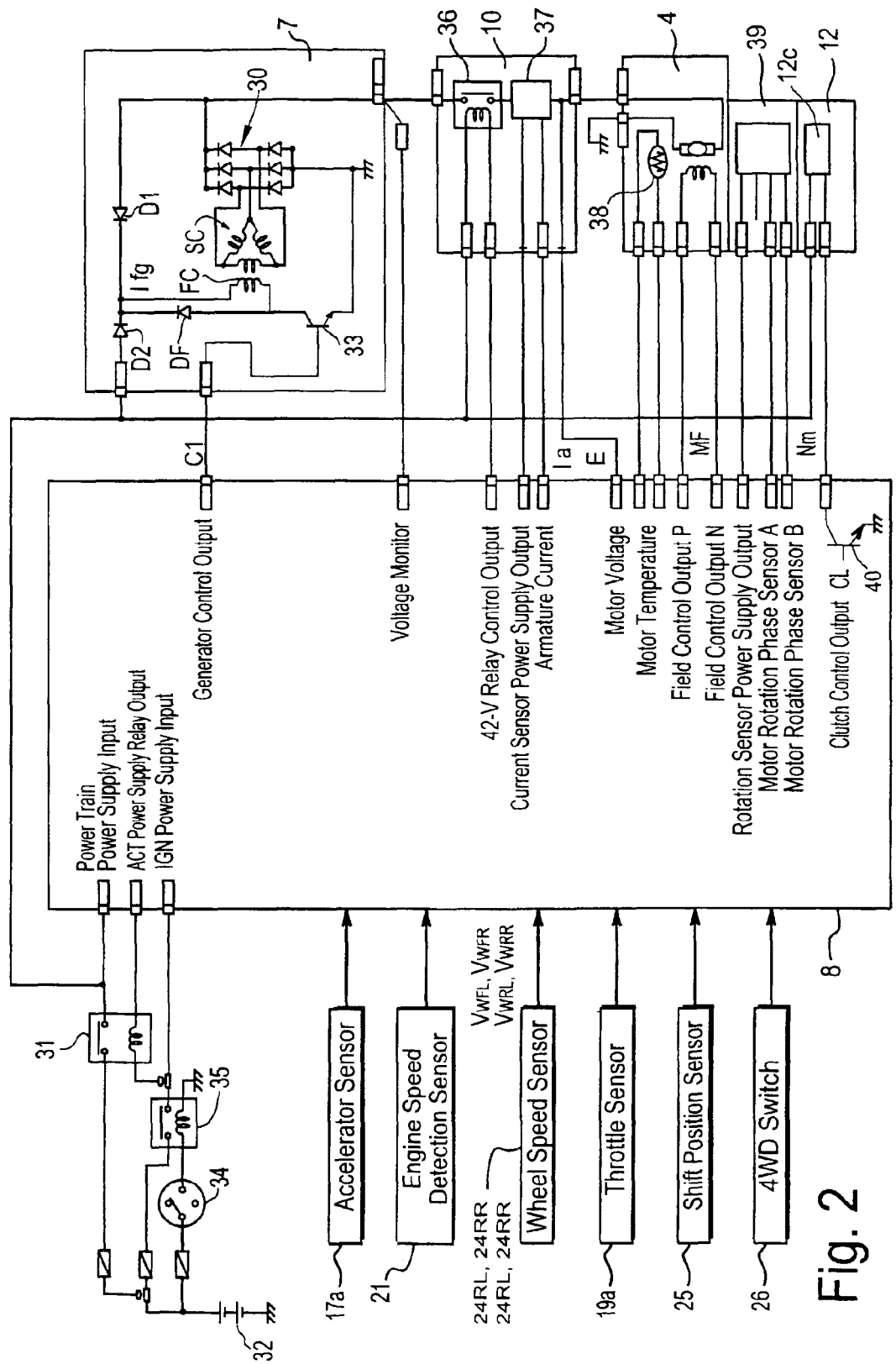
FIG. 2 is a block diagram showing a control system configuration for the vehicle driving force control apparatus illustrated in FIG. 1 in accordance with the illustrated embodiments of the present invention.

Referring initially to FIGS. 1 and 2, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels.

A portion of the engine output torque Te of the internal combustion engine 2 is transmitted to the left and right front wheels 1L and 1R through an automatic transmission 5, equipped with a torque converter, and a differential gear 5a in a conventional manner. An endless drive belt 6 transfers power from the internal combustion engine 2 to a generator 7, which supplies electrical-energy to the electric motor 4. Thus, a portion of the engine output torque Te of the internal combustion engine 2 is transmitted to the generator 7 through the endless belt drive 6 to supply electrical energy to the electric motor 4.

The generator 7 rotates at a rotational speed Ng that is equal to the product of the rotational speed Ne of the internal combustion engine 2 and the pulley ratio of the endless drive belt 6. The load placed on the internal combustion engine 2 by the generator 7 due to the field current Ifg of the generator 7 is adjusted by the 4WD controller 8 to generate a voltage corresponding to the load torque. The generator 7 then generates an electromotive force in proportion to this load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner. Each of the left and right output sides of the differential gear 13 are linked to the left and right rear wheels 3L and 3R through the drive shafts 13L and 13R, respectively.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8. The clutch 12 has an input shaft 12a coupled to the electric motor 4 via the reduction gear 11, and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2.

A main throttle valve 15 and a sub throttle valve 16 are disposed inside the intake passage 14 (e.g., an intake manifold) of the internal combustion engine 2. The throttle opening of the main throttle valve 15 is adjusted and controlled in accordance with the amount of depression of the accelerator pedal 17, which also constitutes or functions as an accelerator position detecting device or sensor, or a throttle opening instructing device or sensor. In order to adjust the throttle opening degree of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 17a that detects the depression amount of the accelerator pedal 17 or the degree of opening of the main throttle valve 15. The depression amount detection value from the accelerator sensor 17a is outputted as a control signal to the 4WD controller 8. The accelerator sensor 17a constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening degree in response to drive signals from a motor controller 20. Specifically, the throttle opening degree of the sub throttle valve 16 is adjusted and controlled by the rotational angle of the stepper motor 19, which corresponds to the step count. The rotational angle of the stepper motor 19 is adjusted and controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

In addition, a shift position sensor 25 is installed that functions as a gear ratio detection device or section detects the shift position of the aautomatic transmission 5. The shift position detected by the shift position sensor 25 is input to the 4WD controller 8. Even further, the 4WD switch 26 is installed close to the driver's seat that selects a drive state or mode. The switch signal of this 4WD switch 26 is input to the 4WD controller 8. The 4WD switch 26 forms part of a drive mode selection section of the present invention.

The wheels 1L, 1R, 3L and 3R are provided with wheel speed sensors 24FL, 24FR, 24RL, and 24RR, respectively. Each speed sensor 24FL, 24FR, 24RL, and 24RR outputs a pulse signal corresponding to the rotational speed of the respective wheel 1L, 1R, 3L and 3R to the 4WD controller 8. Thus, the wheel speeds $V_{WFL} \sim V_{WRR}$ detected by these wheel speed sensors 24FL, 24FR, 24RL, and 24RR are also output to the 4WD controller 8. Each of the pulse signals serves as a wheel speed detection value indicative of the rotational speed of the respective wheel 1L, 1R, 3L and 3R, respectively. The wheel speed sensors 24RL and 24RR constitute an output shaft rotational speed detector or sensor of the clutch 12.

As shown in FIG. 2, the generator 7 has a three-phase stator coil SC connected in a delta formation and a field coil FC. Each of the connection nodes of the stator coil SC is connected to a rectifying circuit 30 made up of diodes and the rectifying circuit 30 delivers a maximum DC voltage Vg of, for example, 42 V.

One end of the field coil FC is connected to the output side of the rectifying circuit 30 through a diode D1 and to a battery 32 of a prescribed voltage (e.g., 12 volts) through a diode D2 in the reverse direction and a 4WD or 12-volt relay 31. The other end of the field coil FC is connected to the cathode sides of the diodes D1 and D2 through a flywheel diode DF in the forward direction, and is grounded through a bipolar transistor 33 comprising a voltage regulator.

The 12-volt battery 32 supplies operating electric power to the 4WD controller 8 with the 12-volt relay 31 that is installed in the 12-volt electric power supply line in order to connect and disconnect the power to the clutch 12, which is preferably an electromagnetic clutch.

The circuitry that supplies the field current Ifg through the rectifying circuit 30 and the diode D1 forms a self excited circuit and the circuitry that supplies the field current Ifg through the battery 32 and the diode D2 forms a separately excited circuit. The diodes D1 and D2 function as a select-high mechanism that selects the higher voltage between the voltage of the self excited circuit and the voltage of the separately excited circuit.

The 4WD or 12-volt relay 31 is configured such that one end of its relay coil is connected to the output side of an ignition coil or relay 35 that is connected to the battery 32 through an ignition switch 34 and the other end of the relay coil connected to the 4WD controller 8.

The generator load torque Tg that the generator 7 imposes on the engine 2 and the generated voltage Vg are controlled by the 4WD controller 8 by adjusting the field current Ifg going through the field coil FC. The bipolar transistor 33 receives a pulse width modulated (PWM) generator control command (duty ratio or field current value) C1 from the 4WD controller 8 and adjusts the value of the field current Ifg of the generator 7 in accordance with the generator control command C1.

The motor relay 36 and the current sensor 37 are connected in series inside the junction box 10. The motor relay 36 connects and disconnects the electric power supplied to the electric motor 4 in accordance with a command from the 4WD controller 8. The current sensor 37 detects the armature current Ia supplied to the electric motor 4 from the generator 7 and outputs the detected armature current Ia to the 4WD controller 8. The motor voltage Vm of the electric motor 4 is detected at the 4WD controller 8.

As mentioned above, the field current Ifm of the electric motor 4 is controlled by a pulse width modulated field current control command, i.e., motor output torque command, from the 4WD controller 8 and the drive torque Tm is adjusted by adjusting the field current Ifm. The temperature of the electric motor 4 is detected by the thermistor 38 and the temperature detection value is fed to the 4WD controller 8. The rotational speed Nm of the output shaft of the electric motor 4 is detected by the motor rotational speed sensor 39 and the rotational speed Nm is also fed to the 4WD controller 8.

The electric clutch 12 has an excitation coil 12c having one end connected to the output side of the 4WD relay 31 and the other end connected to the 4WD controller 8. Inside of the 4WD controller 8, the other end of the excitation coil 12c is connected to ground via a switching transistor 40 that serves as a switching element. The current in the excitation coil 12c is controlled by a pulse width modulated clutch control command CL supplied to the base of the transistor 40. As a result, the torque transmitted to the rear wheels 3L and 3R (subordinate drive wheels) from the electric motor 4 is controlled.

In addition, the brake sensor 42 is installed that detects either the stroke of the brake pedal 41 or the switch signal of the brake lamp switch. The detection signal of this brake sensor 42 is input to the 4WD controller 8.

In addition, a brake pedal 41 is provided that constitutes a brake instructing/operating section. The stroke amount of the brake pedal 41 or the switch signal of the brake lamp switch is detected by a brake sensor 42, which constitutes a brake operation amount sensor. The brake sensor 42 outputs the brake stroke amount or the switch signal of the brake lamp switch that it detects to the 4WD controller 8.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Figure 3:
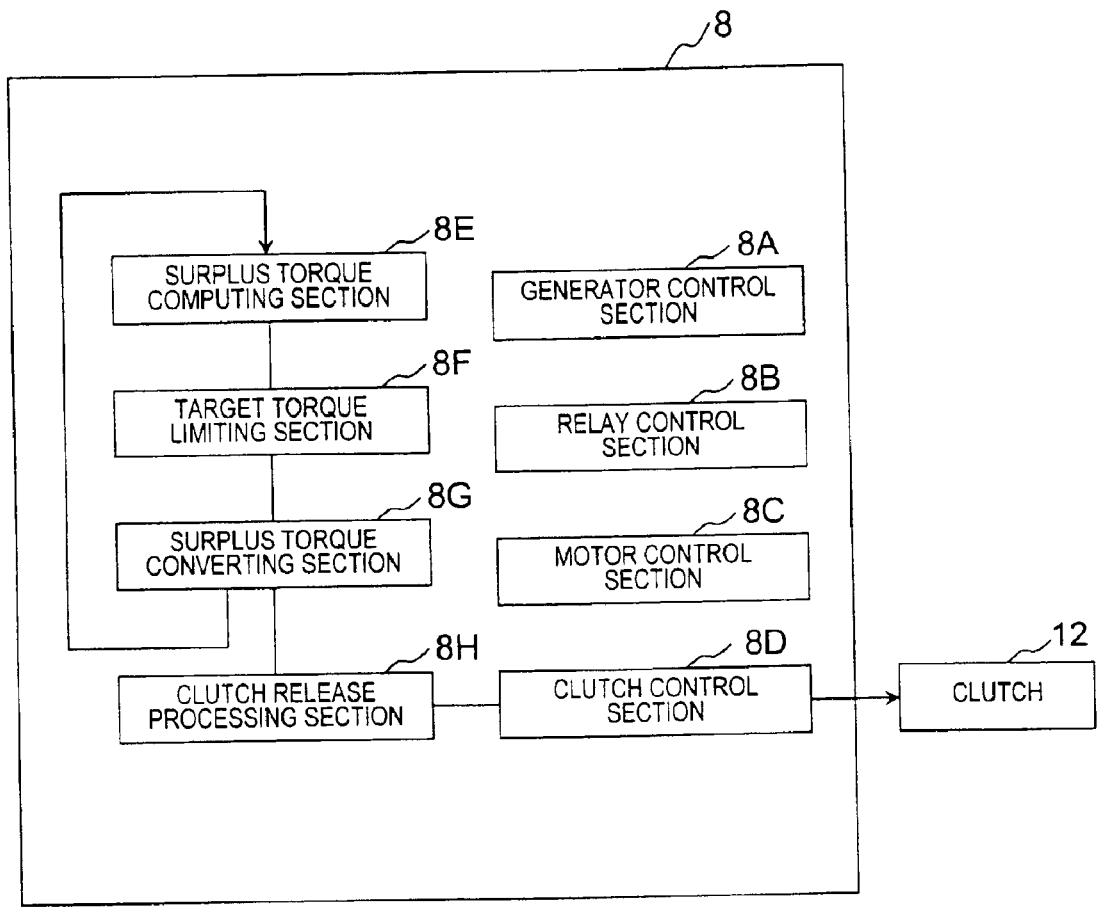
FIG. 3 is a functional block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, and a clutch release processing section 8H.

Figure 4:
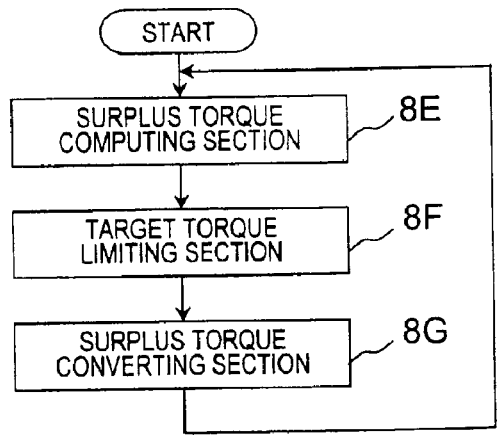
FIG. 4 is a flow chart showing the processing sequence executed by the 4WD controller for the vehicle driving force control apparatus illustrated in FIG. 1 in accordance with the illustrated embodiments of the present invention.

As shown in FIG. 4, at a prescribed sampling time cycle, the 4WD controller 8 executes the processing of the surplus torque computing section 8E, the target torque limiting section 8F, and the surplus torque converting section 8G in sequence based on the input signals. Together, the surplus torque computing section 8E, the target torque limiting section 8F, and the surplus torque converting section 8G constitute an output torque control section of the 4WD controller 8.

Through the bipolar transistor 45 of the voltage adjuster 22, the generator control section 8A monitors the generated voltage V of the generator 7 and adjusts the generated voltage Vg of the generator 7 to the required voltage by adjusting the field current Ifg of the generator 7. Thus, the generator control section 8A functions as a generation load torque adjusting section.

The relay control section 8B controls shutting off and connecting the electrical power supply from the generator 7 to the electric motor 4.

The motor control section 8C adjusts the field current Ifm of the electric motor 4 based on the motor field target current Ifmt that is computed by the surplus torque converting section 8G (discussed later) in order to adjust the torque of the electric motor 4 to the required value.

The motor control section 8C calculates a corresponding motor torque target value Tm based on the generator load torque target value Tgt computed by the surplus torque converting section 8G (discussed below). Thus, the clutch control section 8D controls the state of the clutch 12 by outputting a clutch control command to the clutch 12. The clutch control section 8D constitutes the clutch engagement control section of the present invention. Then the clutch control section 8D calculates the clutch transmission torque $T_{CL}$ of the electric clutch 12 by executing the calculation of the Equation (1) shown below based on the motor torque target value Tm. Next, the clutch control section 8D converts the clutch transmission torque $T_{CL}$ into a clutch current command value $I_{CL}$. The clutch control section 8D then pulse-width modulates (PMW) the clutch current command value $I_{CL}$, and calculates a clutch current control output CL having a duty ratio that corresponds to the clutch current command value $I_{CL}$. The clutch current control output CL is delivered to the switching transistor 40.

$$T_{CL} = Tmt \times K_{DEF} \times K_{TM} + T_{CL0} \quad (1)$$

In this Equation (1), $K_{DEF}$ is the reduction ratio of the differential gear 13, $K_{TM}$ is the clutch torque margin and $T_{CL0}$ is the clutch initial torque.

Figure 5:
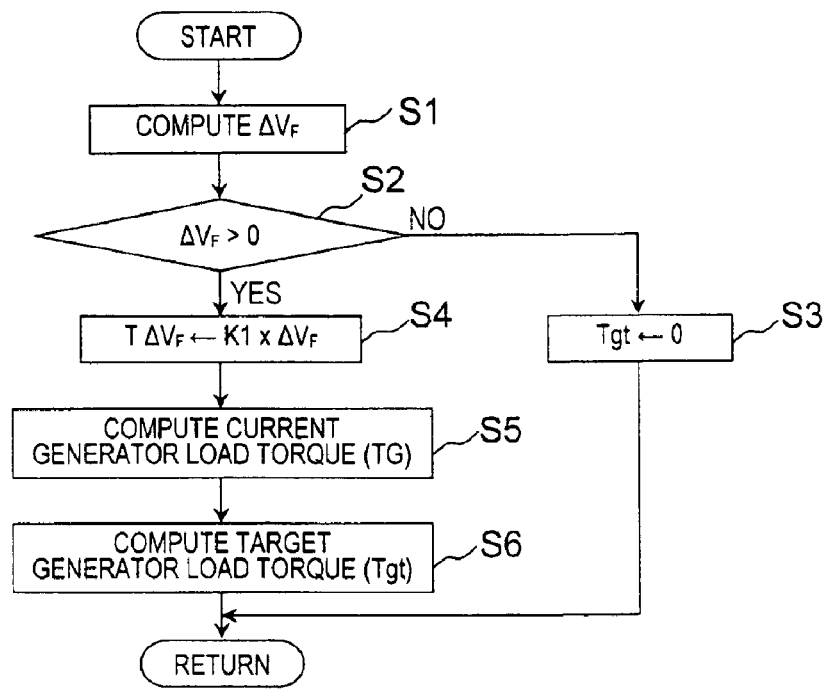
FIG. 5 is a flow chart showing the processing sequence executed by the surplus torque computing section of the 4WD controller for the vehicle driving force control apparatus illustrated in FIG. 1 in accordance with the illustrated embodiments of the present invention.

Next, the surplus torque computing section 8E will be discussed which executes the processing shown in FIG. 5. First, in step S1, the wheel speeds computed based on the signals from the wheel speed sensors 24FL, 24FR, 24RL and 24RR are used to subtract the wheel speed of the rear wheels 3L and 3R (subordinate drive wheels) from the wheel speed of the front wheels 1L and 1R (main drive wheels) and find the slippage speed $\Delta V_F$, which is the magnitude of the acceleration slippage of the front wheels 1L and 1R. Then, the 4WD controller 8 proceeds to step S2.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (2) and (3):

$$V_{Wf} = (V_{Wfl} + V_{Wfr})/2 \quad (2)$$

$$V_{Wr} = (V_{Wrl} + V_{Wrr})/2 \quad (3)$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (4):

$$\Delta V_F = V_{Wf} - V_{Wr} \quad (4)$$

In step S2, the 4WD controller 8 determines whether or not the calculated slippage speed $\Delta V_F$ exceeds a prescribed value, such as zero. Thus, steps S1 and S2 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S3, where a target generator load torque Tgt is set to zero. The 4WD controller 8 then proceeds to the target torque limiting section 8F process.

Conversely, if in step S2 slippage speed $\Delta V_F$ is determined to be larger than zero, it is estimated that the front wheels 1L and 1R are experiencing acceleration slippage, and thus, control proceeds to step S4.

In step S4, the absorption torque $T\Delta V_F$ required for suppressing the acceleration slippage of the front wheels 1L and 1R is calculated using the Equation (5) below and the 4WD controller 8 proceeds to step S5. The absorption torque $T\Delta V_F$ is an amount that is proportional to the acceleration slippage magnitude, as set forth in the following Equation (5):

$$T\Delta V_F = K1 \times \Delta V_F \quad (5)$$

where: K1 is a gain that is found through experimentation or the like.

In step S5, a current load torque TG of the generator 7 is calculated based on the Equation (6) below, and then the 4WD controller 8 proceeds to step S6.

$$TG = K2 \frac{Vg \times Ia}{K3 \times Ng} \quad (6)$$

where: Vg: voltage of the generator 7,
Ia: armature current of the generator 7,
Ng: rotational speed of the generator 7,
K3: efficiency, and
K2: coefficient.

In step S6, the surplus torque, i.e., the target generator load torque Tgt that the generator 7 should impose, is found based on the Equation (7) stated below, and the 4WD controller 8 returns to the beginning of the control loop.

$$Tgt = TG + T\Delta V_F \quad (7)$$

Figure 6:
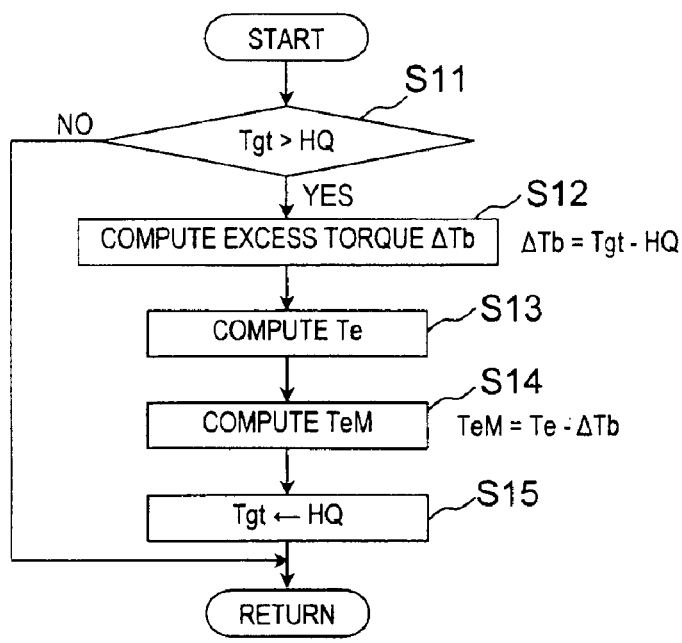
FIG. 6 is a flow chart showing the processing sequence executed by the target torque control (limiting ) section of the 4WD controller for the vehicle driving force control apparatus illustrated in FIG. 1 in accordance with the illustrated embodiments of the present invention.
Figure 7:
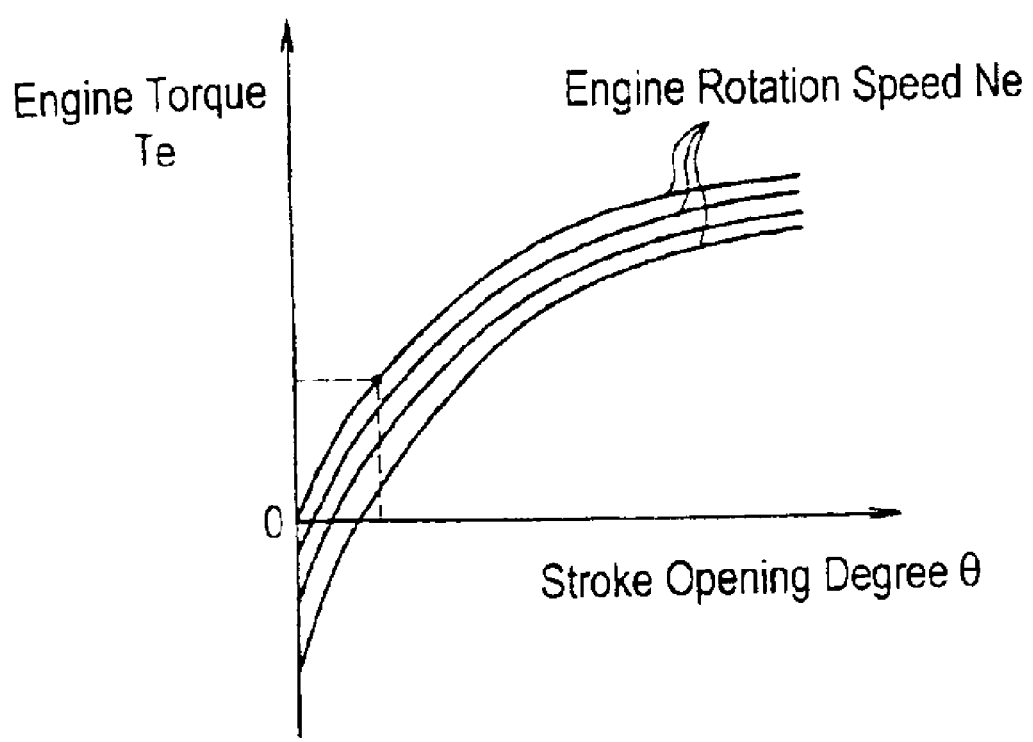
FIG. 7 is an engine torque calculation map showing the relationship between the throttle degree θ and the engine torque Te for different engine rotational speeds Ne.

Next, the processing executed by the target torque (control) limiting section 8F will be explained based on FIG. 6. The processing of the target generator load torque Tgt in the flow chart of FIG. 6 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S11, the target torque limiting section 8F of the 4WD controller 8 determines whether or not the target generator load torque Tgt is larger than the maximum load capacity HQ of the generator 7. The 4WD controller 8 proceeds to the beginning of the control program to repeat the processing if the 4WD controller 8 determines that target generator load torque Tgt is less than or equal to the maximum load capacity HQ of the generator 7. Conversely, the 4WD controller 8 proceeds to step S12 if the 4WD controller 8 determines that the target generator load torque Tgt is larger than the maximum load capacity HQ of the generator 7.

In step S12, the excess torque ΔTb, which is a portion of target generation load torque Tgt that exceeds the maximum load capacity HQ, is found according to the following Equation (8):

$$\Delta Tb = Tgt - HQ. \quad (8)$$

Then, the 4WD controller 8 proceeds to step S130.

In step S13, the current engine torque Te is computed based on the signals from the throttle sensor 19a and the engine rotational speed sensor 21 using an engine torque calculation map. Then, the 4WD controller 8 proceeds to step S14.

In step S14, the engine torque upper limit value TeM is calculated by subtracting the excess torque ΔTb from the engine torque Te, as set forth in the following Equation (9):

$$TeM = Te - \Delta Tb. \quad (9)$$

After the engine torque upper-limit value TeM is outputted to the engine controller 18, the 4WD controller 8 proceeds to step S15.

In this Equation (9), the engine controller 18 is not related to the operation of the accelerator pedal 17 by the operator but limits this engine torque Te such that the input engine torque upper limit value TeM becomes the upper limit value of the engine torque Te.

In step S15, the maximum load capacity HQ is assigned as the target generation load torque Tgt, and then the 4WD controller 8 process ends and proceeds to the surplus torque converting section 8G process.

Next, the processing executed by the surplus torque converting section 8G will be explained based on FIG. 8.

First, in step S20, the 4WD controller 8 determines if the vehicle is experiencing acceleration slippage by determining if the slippage speed $\Delta V_F$ is larger than zero. If the slippage speed $\Delta V_F$ is determined to be larger than zero, the 4WD controller 8 proceeds to step S21 because the front wheels 1L and 1R are experiencing acceleration slippage. If the 4WD controller 8 determines that the slippage speed $\Delta V_F$ is less than or equal to zero, then the 4WD controller 8 does not proceed to step S21 because the front wheels 1L and 1R are not experiencing acceleration slippage. Rather, the 4WD controller 8 proceeds to the surplus torque computing section 8E (FIG. 5) if the vehicle is not experiencing acceleration slippage.

Figure 8:
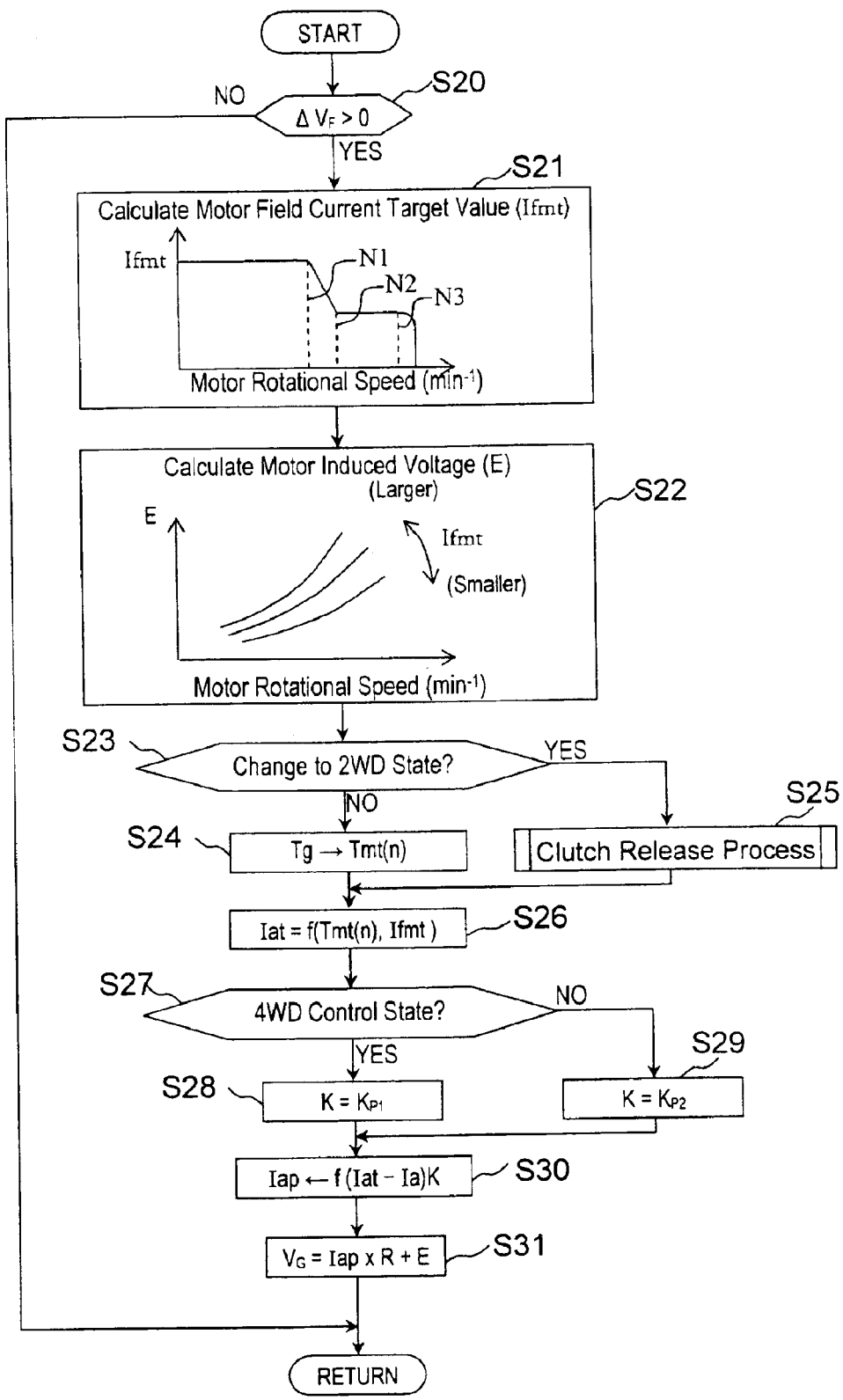
FIG. 8 is a flow chart showing the processing sequence executed by the surplus torque converting section of the 4WD controller for the vehicle driving force control apparatus illustrated in FIG. 1 in accordance with the first embodiment of the present invention.

In step S21, the rotational speed Nm of the motor 4 detected by the motor rotational speed sensor 39 is input and then based on that rotational speed Nm of the motor 4, the motor field current target value Ifmt is computed referencing the motor field current target value computation map shown in FIG. 8 and the computed motor field current target value Ifmt is output to the motor control section 8C.

In step S21, the 4WD controller 8 receives the rotational speed Nm of the electric motor 4 detected by the motor rotational speed sensor 39 and calculates the motor field current target value Ifmt based on the rotational speed Nm of the electric motor 4 using the motor field current target value calculation map shown in FIG. 8. The computed motor field current target value Ifmt is then output to the motor control section 8C.

The target motor field current calculation map was created based on the first gear of the drive range (D) of the automatic transmission 5, which is the gear with the highest gear ratio in that range. The motor field current target value Ifmt follows a characteristic curve that is plotted with the motor rotational speed Nm on the horizontal axis and the motor field current target value Ifmt on the vertical axis as shown in FIG. 8. In the range of motor rotational speeds Nm from zero to the first predetermined value N1, the motor field current target value Ifmt holds at a preset maximum current value $I_{MAX}$. If the motor rotational speed increases beyond the predetermined value N1, the motor field current target value Ifmt decreases accordingly at a comparatively large slope. Then, at rotational speeds between a second predetermined value N2 that is larger than the first predetermined value N1 and a third predetermined value N3 that is larger than the second predetermined value N2, the motor field current target value Ifmt holds at a low current value $I_L$ that is smaller than the initial current value $I_{IN}$. If the motor rotational speed Nm increases further and exceeds the first predetermined value N3, the motor field current target value Ifmt decreases at a still larger slope until it reaches 0.

Thus, the field current of the electric motor 4 is held at a fixed prescribed current value $I_{MAX}$ in the range of rotational speeds Nm from 0 to the predetermined value N1 and reduced using a known using a known weak magnetic field control method when the electric motor 4 is rotating at a speed above the predetermined value N1 (see FIG. 8). In short, when the electric motor 4 rotates at a high speed the motor torque decreases due to the rise in the induced voltage E in the electric motor 4. Therefore, as discussed earlier, when the rotational speed Nm of the electric motor 4 reaches or exceeds the prescribed value N1, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

Next, the process proceeds to step S22. In step S22, the 4WD controller 8 calculates the motor induced voltage E based on the motor rotational speed Nm and the motor field current target value Ifmt calculated in step S21 using the motor induced voltage calculation map shown in FIG. 8. The motor induced voltage calculation map is configured such that curves for different motor field current target values Ifmt are plotted on a graph having the motor rotational speed Nm on the horizontal axis and the motor induced voltage E on the vertical axis. The motor induced voltage E increases substantially linearly as the motor rotational speed Nm increases, and the motor induced voltage E also increases as the motor field current target value Ifmt increases.

Next, the process proceeds to step S23. In this step 23, the 4WD controller 8 determines whether or not the 4WD drive state has ended and is changing to a two-wheel drive state. This determination is done by determining whether or not a drive state flag F has changed from "1" to "0". When the drive state operating flag F is set to "1" and the 4WD drive state continues, then the process proceeds to step S24 and the corresponding motor torque target value Tmt is computed based on the generated power load torque target value Tgt, which was computed by the surplus torque computing section 8E. The process then proceeds to step S26. When the 4WD drive state is changing to a two-wheel (2WD) drive state, the process proceeds to step S25 and the clutch release process, shown in FIG. 10 (discussed later) executes and the process proceeds to step S26.

Here, the drive state flag F is reset to "0" when the clutch 12 is in a released state. When the clutch 12 is controlled in a clutch engaged state from this released state, the drive state flag F is set to "1". Furthermore, when the motor torque target value Tmt continues a reduction state and is also equal to or less than the motor torque threshold value Th1 that define the conditions to end the 4WD drive state previously set by the motor torque target value Tmt and change over to a two-wheel drive state, the drive state flag F is reset to "0".

Figure 9:
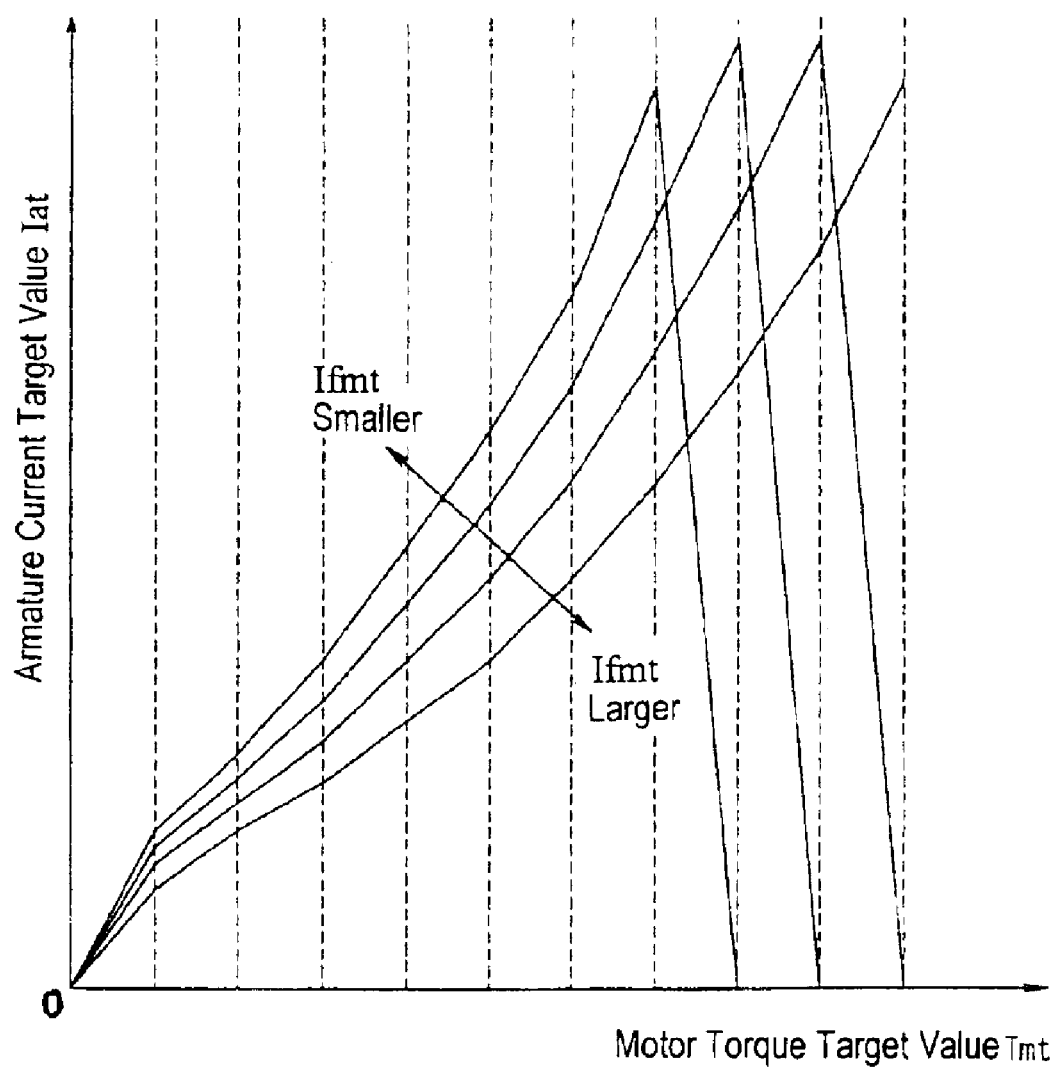
FIG. 9 is an armature current target value calculating map showing the relationship between the motor torque target value and the armature current target value for different motor field current target values.

In step S26, the 4WD controller 8 calculates the armature current value Iat based on the motor torque target value Tmt and the motor field current target value Ifmt using the armature current target value calculation map shown in FIG. 9. The armature current target value calculation map is configured such that curves for different motor field current target values Ifmt are plotted on a graph having the motor torque target value Tmt on the horizontal axis and the armature current target value Iat on the vertical axis. When the motor output torque Tmt is zero, the armature current target value Iat is zero regardless of the value of the motor field current target value Ifmt. As the motor output torque Tm increases the armature current target value Iat increases, but as the motor field current target value Ifmt increases the armature current target value Iat decreases. When the motor output torque Tmt becomes larger, the armature current target values Iat go to zero sequentially in order from the smallest motor field current target value Ifmt.

Next, the process proceeds to step S27. In this step a determination is made as to whether the drive state flag F has been set to "1" during drive control. When the flag has been set to "1" during drive control, the process proceeds to step S28. Then, after setting a normal responsive value $K_{P1}$ (a comparatively small value that takes stability into consideration) as the control gain K, the process proceeds to step S29. When the drive state flag F has been reset to "0" during a changeover to two-wheel drive state, the process proceeds to step S29 and then after setting a high responsive value $K_{P2}$, that is set to a value larger than the normal responsive value $K_{P1}$ in order to consider the responsiveness and obtain a high responsiveness, as the control gain K, the process proceeds to step S29.

In step S30, an armature current control value Iap is calculated by multiplying the control gain K by a current deviation (the armature current Ia detected by the current sensor 37 is subtracted from the armature current target value Iat) as seen in the following Equation (10).

$$Iap=(Iat-Ia)K \quad (10)$$

Next, the process proceeds to step S31. In this step 31, after computing the voltage target value $V_G$ of the generator 7 from the armature current control value Iap, the combined resistance R of the electrical line 9 and the resistance R of the coil resistance of the motor 4, as well as the induced voltage E based on the following Equation (11) and then outputting the voltage target value $V_G$ of the generator 7 to the generator control section 8A, the process ends and then returns to the surplus torque computing section 8E.

$$V_G=Iap \times R+E \quad (11)$$

Figure 10:
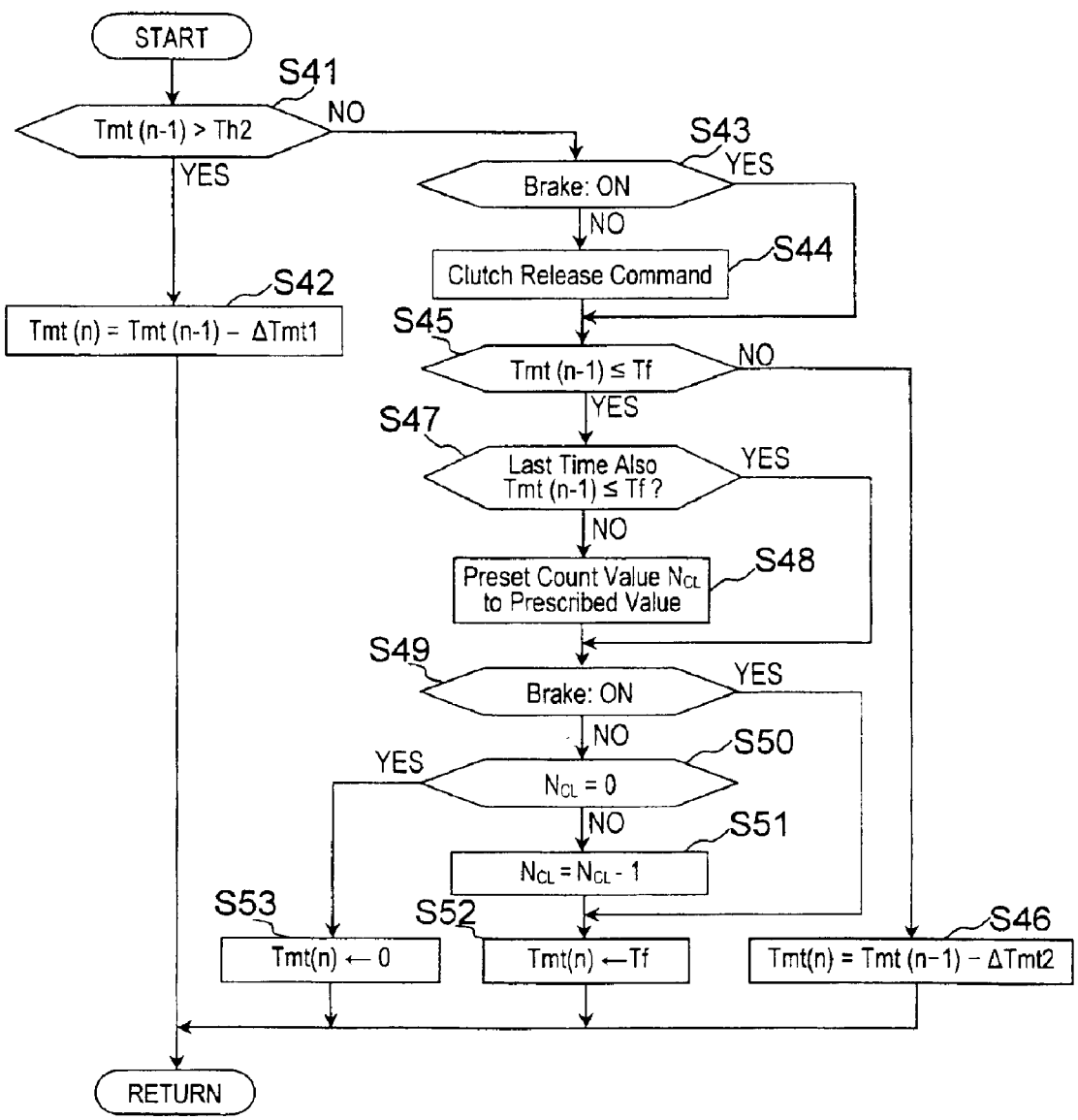
FIG. 10 is a flow chart showing the processing sequence executed by the clutch release processing section of FIG. 8 for the vehicle driving force control apparatus illustrated in FIG. 1 in accordance with the first embodiment of the present invention.

In the above-mentioned clutch release process of step S25, the clutch release process is executed as shown in FIG. 10. First, a determination is initially made in step S41 as to whether or not the last motor torque target value Tmt(n-1) exceeds the motor torque threshold value Th2 that is required to output a release command to the clutch 12. This motor torque threshold value Th2 is smaller than the motor torque threshold value Th1 that is set to determine a transition condition wherein a comparatively large drive force ends such that the control makes a transition from the four-wheel (4WD) drive state to the two-wheel (2WD) drive state. When the last motor torque target value Tmt(n-1) exceeds the motor torque threshold value Th2, the determination is that the motor torque reduction process is executing and the motor torque is still decreasing towards the motor torque threshold value Th2 and the process proceeds to step S42.

In step S42, the current motor torque target value Tmt(n) is set to a lower value by subtracting a fixed value ΔTmt1, that determines by a fixed slope, from the last motor torque target value Tmt(n-1) using the following Equation (12).

$$Tmt(n)=Tmt(n-1)-\Delta Tmt1 \quad (12)$$

Then, the clutch release process of FIG. 10 ends, and the process proceeds to step S26 shown in FIG. 8.

Figure 11:
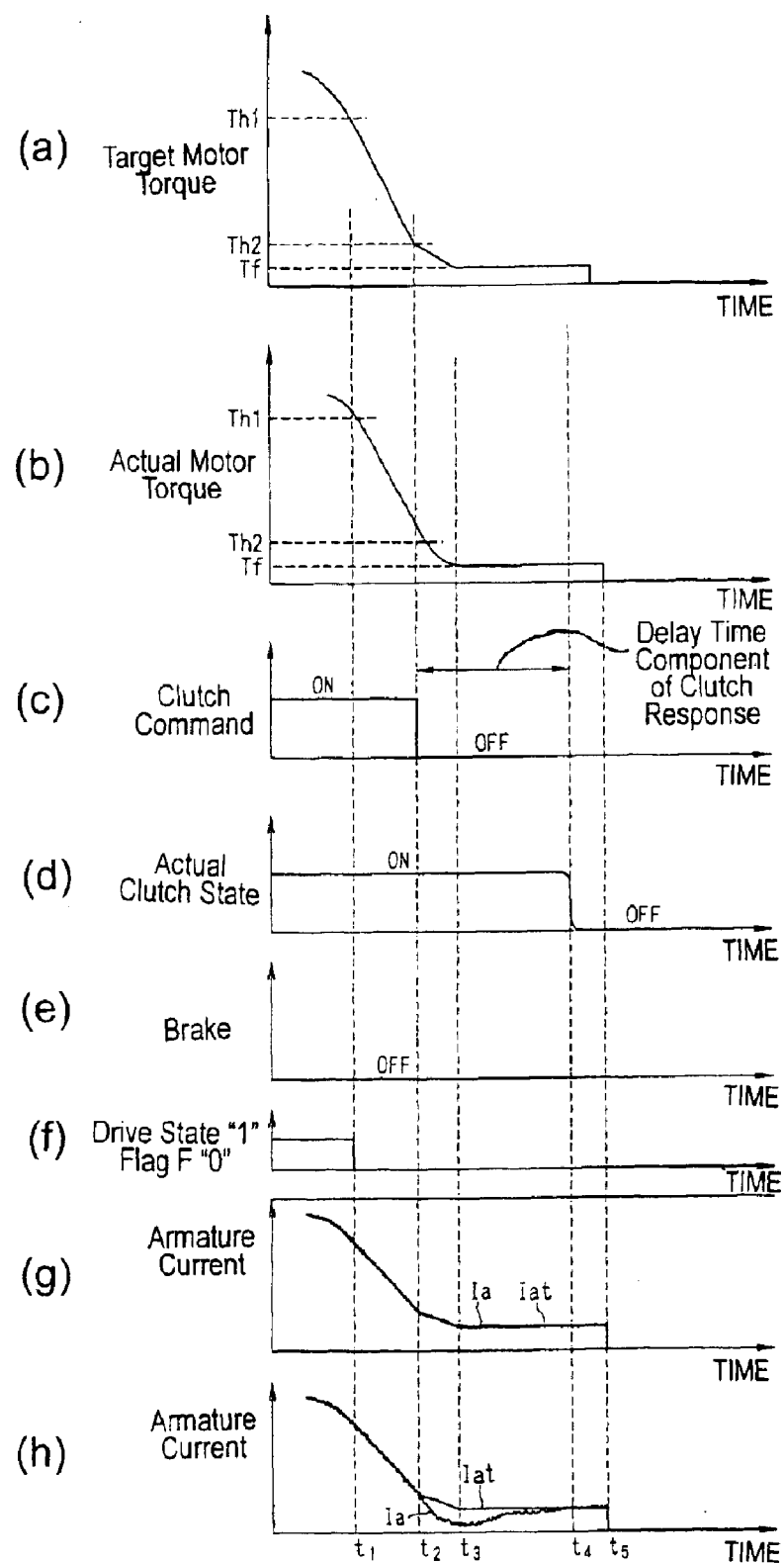
FIG. 11 are a series of timing charts for explaining the operation of the vehicle driving force control apparatus illustrated in FIG. 1 in accordance with the first embodiment of the present invention.

When the determination result of step S41 is the last motor torque target value Tmt(n-1) is less than or equal to the motor torque threshold value Th2, the process proceeds to step S43 and a determination is made as to whether or not the brake is ON. This determination is made based on the detection signal of the brake sensor 42. If this determination is that the brake is ON, i.e., a controlled state, then the process jumps directly to step S45. If this determination is that the brake is OFF, then the process proceeds to step S44, where the clutch release command is output to the clutch control section 8D and then the process proceeds to step S45. Here, the clutch 12 is actually not immediately released once the clutch release command has been outputted. Rather, the clutch is released after an operating delay of the clutch 12 has elapsed. In other words, there is a clutch response delay time that elapses between the time when the clutch release command is issued and the time when the clutch 12 is actually released as seen by FIG. 11. This clutch response delay time is ascertained in advance.

In step S45, a determination is made as to whether or not the last motor torque target value Tmt(n-1) is equal to or less than the clutch release torque Tf. The clutch release torque Tf is a motor torque that does not cause shocks when the electromagnetic clutch 12 is released from the engaged state. Here, the clutch release torque Tf is a value found by either calculations using a map or computations in proportion to the vehicle acceleration or friction of the torque transmission path on the motor side or by experimentation. Specifically, the clutch release torque Tf is the motor torque value needed to bring the torque on the clutch 12 to zero during vehicle travel, as-described above. Thus, the clutch release torque Tf is estimated to-be the sum (Tf=$Tf_1$+$Tf_2$) of "the torque $Tf_1$ for the friction of the electric motor and the reduction gear" and "the torque $Tf_2$ for accelerating the electric motor and the reduction gear equally with the acceleration of the rear wheels." A corresponding fixed value of $Tf_1$ can be obtained by friction and found by experimentation when this clutch release torque Tf is larger than the torque $Tf_2$ that accelerates the torque $Tf_1$ by friction.

If the determination in step 45 determines that the last motor torque target value Tmt(n-1) is greater than the clutch release torque Tf, then the process proceeds to step S46. In other words, a gradual torque reduction control is determined wherein the torque gradually moves toward the clutch release torque Tf.

In step S46, the last motor torque target value Tmt(n−1) is reduced by a fixed reduction value ΔTmt2. The fixed reduction value ΔTmt2 is a smaller value than the fixed reduction value ΔTmt1. Thus, a new motor torque target value Tmt(n) is computed from the last motor torque target value Tmt(n−1) such that the motor torque target value Tmt(n) is reduced at a lower rate than in step S42. Then, the clutch release process ends and the process proceeds to step S26 of FIG. 8.

Conversely, if in step S45 the motor torque target value Tmt(n) is determined to have reached or fallen below the clutch release torque Tf, then the process proceeds to step S47.

In step S47, a determination is made as to whether or not the motor torque target value Tmt(n−1) is equal to or less than the clutch release torque Tf during the last process. If the motor torque target value Tmt(n−1) is determined to have reached or fallen below the initial clutch release torque Tf at this time, when the last motor torque target value Tmt(n−1) was greater than the clutch release torque Tf, during the last process, the process proceeds to step S48.

In step S48, the count value $N_{CL}$ of the clutch release time clock counter is set to a prescribed value, and then the process proceeds to step S49. When the motor torque target value Tmt(n−1) is equal to or less than the clutch release torque Tf during the last process, the process jumps directly to step S49.

In step S49, a determination is made as to whether or not the brake is ON based on the detection signal of the brake, sensor 42. When the signal indicates that the brake is ON, the process jumps directly to step S52. When the signal indicates that the brake is OFF, the process proceeds to step S50.

In step S50, a determination is made as to whether or not the count value $N_{CL}$ of the clutch release time clock counter is "0". When this determination result is that the count value $N_{CL}$ is greater than zero, the process proceeds to step S51.

In step S52, the count value $N_{CL}$ is decremented by only "1" and then the process proceeds to step S52.

In step S52, the clutch release torque Tf is set as the current motor torque target value Tmt(n). Then the clutch release process ends and the process proceeds to step S26 of FIG. 8.

When the determination result of step S50 is $N_{CL}$=0, the process proceeds to step S53, where the current motor torque target value Tmt(n) is set to "0". Then, the clutch release process ends and the process proceeds to step S26 of FIG. 8.

In the process of FIG. 8, the process of steps S27 to S29 correspond to the variable responsiveness method, while the process of steps S22 to S26, S30 and S31 correspond to the electric motor (armature current) control section or method. From among these steps, the process of step S24 corresponds to the electric motor torque computing section or method, the process of step S25 and the process of FIG. 10 correspond to the clutch release method, the process of step S26 corresponds to the electric or armature current target value computation section or method, and the process of step S30 and step S31 correspond to the generator output control section or method.

Next, the operation of this embodiment will be discussed referring to the timing charts of FIG. 11.

Now, by placing the selector lever of the automatic transmission to the parking position (P) and turning the ignition switch ON, the internal combustion engine 2 will start with the vehicle in a stopped state.

If the operator sets the 4WD switch 26 to the ON state or four-wheel drive mode with the vehicle stopped, the relay control section 8B controls the 4WD relay 31 to an OFF state and the input of the power system power supply is stopped to the 4WD controller 8 since the selector lever is set to the parking position (P). This occurs along with the supply of electrical power from the battery 32 to the field coil FC of the generator 7, the motor relay 36 of the junction box 10, and the clutch coil 12c of the clutch 12 being stopped.

From this stopped state, the operator then shifts the selector lever from the parking position (P) to a drive range (D) through a reverse position (R) and a neutral position (N) and selects a drive range (D). When a fixed time of, for example, 0.05 seconds passes after this operation has occurred, the 4WD relay 31 is controlled to an ON state by the relay control section 8B.

Because the vehicle is in a stopped state, the average front wheel speed $V_{Wf}$ of the front wheels 1L and 1R and the average rear wheel speed $V_{Wr}$ of the rear wheels 3L and 3R are both "0" and the slippage speed $\Delta V_F$ is also "0". Because of this, in the processing of FIG. 8 executed by the surplus torque converting section 8G, the process ends and returns to the surplus torque computing section. 8E without executing the processes of steps S21 to S25 from step S20.

Because of this, the generator control output C1 and the motor field output MF are both set to OFF by the generator control section 8A based on the generated voltage target value $V_G$. The clutch control output CL is also set to OFF by the clutch control section 8D. Therefore, the power generated by the generator 7 and the drive of the motor 4 are stopped along with the clutch 12 being set to an unengaged state.

From this state, if acceleration slippage occurs in the front wheels 1L and 1R (main drive wheels) due to the vehicle travelling in the forward direction on road surfaces with a low frictional coefficient, such as roads wet with rain, snow or frost, then the wheel speed differences of the front and rear wheels will make the slippage speed $\Delta V_F$ a positive value even if the accelerator pedal 17 is stepped-down on strongly and vehicle quickly accelerates, or if the accelerator pedal 17 is not stepped down on strongly.

At this time, the clutch control output CL is controlled to a prescribed duty rate by the clutch control section 8D setting the clutch 12 to an engaged state along with the drive state operating flag F is set to "1". Because the slippage speed $\Delta V_F$ changes to a positive value in the processing of FIG. 5 in the surplus torque computing section 8E, simultaneous with this, the process proceeds from step S2 to step S4. Then, the required absorption torque $T\Delta V_F$ is computed in order to multiply the gain K1 by the slippage speed $\Delta V_F$ and restrain the acceleration slippage. Next, the Equation (6) discussed earlier is used to compute the current generated load torque TG (step S5) based on the current generated voltage Vg, the armature current Ia and the generator rotational speed Ng. Since this current generated load torque TG has a comparatively small generator rotational speed Ng while the vehicle is traveling, it will increases in proportion to increases in the generated voltage Vg and the armature current Ia. Also, since the absorption torque $T\Delta V_F$ and the current generated load torque TG are multiplied to compute the generated load torque target value Tgt, this generated load torque target value Tgt increases as well.

The generated voltage Vg produced by the generator 7 is controlled by the processing of FIG. 8 of the surplus torque converting section 8G although the voltage value obtained by multiplying the running resistance R by the armature current target value Iat computed by referencing the armature current target value calculating map of FIG. 9 based on the motor torque target value Tmt and the motor field current target value Ifmt is added to the induced voltage E in the motor 4 and their sum obtained.

Hereupon, the motor field current target value Ifmt is computed referencing the motor field current target value computation map in step S21 in the processing of FIG. 8 based on the motor rotational speed Nm. Because the motor rotational speed Nm is still slow while the vehicle is travelling, the motor field current target value Ifmt at this time is set to the maximum current value $I_{MAX}$.

In addition, the motor field current target value Ifmt computed in step S21 is output to the motor control section 8C as is without any changes which in turn starts the driving of the motor 4.

Because the motor induced voltage E, subsequently computed in step S22, also increases at this time, the armature current target value Iat, computed in step S26, rises with the passage of time making it possible to ensure the required motor torque Tm. The rotational speed of the motor 4 also increases in proportion to the acceleration slippage in the front wheels 1L and 1R.

As a result, when acceleration slippage occurs in the front wheels 1L and 1R (main drive wheels) when quickly accelerating or travelling on road surfaces with a low frictional coefficient, the rear wheels 3L and 3R (subordinate drive wheels) are driven by the motor 4 so as to cancel the acceleration slippage in the front wheels 1L and 1R thereby making it possible to travel in the vehicle smoothly.

By setting the operating state flag F to "1" when the vehicle starts traveling that causes this acceleration slippage, the process proceeds from step S27 to step S28. Then, normal responsive value $K_{P1}$ (a comparatively small value that takes stability into consideration) is set as the control gain K and the armature current control value Iap is computed based on current deviations between this control gain K and the armature current target value Iat as well as the actual armature current Ia. Because of this, the armature current control value Iap is computed based on the generated voltage Vg of the generator 7 and this value is output to the generator control section 8A. By using this action the generator control signal C1 from this generator control section 8A is output to the transistor 33 as a voltage regulation portion making it possible to ensure the armature current Ia required by the electric motor 4. At this time the control gain is set to normal responsive value $K_{P1}$ (a comparatively small value) thereby making it possible to supply a stable armature current Ia without generating large generated current fluctuations that is generated by the generator 7 and supplied to the armature of the electric motor 4.

Thereafter, following the suppression of the acceleration slippage, the motor torque target value Tmt is continuously reduced as shown in the graph (a) of FIG. 11 and the armature current target value Iat is also reduced in proportion to this as shown in the graph (g) of FIG. 11. When the values are equal to or less than the motor torque threshold value Th1 at time t1, the operating state flag F will change from "1' to "0", as shown in the graph (f) of FIG. 11, and the drive state will change over to a two-wheel drive state. Because of this, the process proceeds from step S23 to step S25 in the processing of FIG. 8 and the clutch release process shown in FIG. 9 is executed.

Immediately after the motor torque target value Tmt is equal to or less-than the motor torque threshold value Th1 in this clutch release process, the last motor torque target value Tmt(n−1) exceeds the motor torque threshold value Th2. Consequently, the process proceeds from step S41 to step S42 and then after setting the value that subtracted the fixed value ΔTmt1 from the last motor torque target value Tmt (n−1) as the current motor torque target value Tmt(n), the process proceeds to step S26 of FIG. 8.

Because of this, the reduction control starts reducing the motor torque target value Tmt(n) at a comparatively large fixed slope as shown in the graph (a) of FIG. 11. Also, as shown in the graph (g) of FIG. 11, the reduction control of the armature current target value Iat also starts at a fixed slope in proportion to the reduction rate of the motor torque target value Tmt(n).

Next, because the operating state flag F changes from "1" to "0" in step S27 during the processing of FIG. 8, the process proceeds to step S29. Thus, instead of normal responsive value $K_{P1}$ being used, the high responsive value $K_{P2}$ is selected as a value larger than normal responsive value $K_{P1}$, and is then set as the control gain K. Therefore, the armature current control value Iap computed in step S30 is a greatly amplified value of the current deviations ΔI that subtracted the actual armature current Ia from the armature current target value Iat. This in turn increases the track ability of the actual armature current Ia with respect to the armature current target value Iat.

Thereafter, when the motor torque target value Tmt(n) reaches the motor torque threshold value Th2 at time t2, the process proceeds from step S41 to step S43 in the clutch release process of FIG. 9. If the brake pedal 41 is released and the detection signal of the brake sensor 42 continues to be in an OFF state as shown in the graph (e) of FIG. 11, the process proceeds to step S44 and the clutch release command for the clutch control section 8D is issued. Therefore, the clutch control section 8D turns OFF electricity by the clutch control output CL for the clutch 12, such that the clutch 12 changes over to a released state after a prescribed response delay time passes, as shown in the graph (d) of FIG. 11, without the clutch 12 being released immediately.

Next, the process proceeds to step S45 where the motor torque target value Tmt(n−1) is a value large than the clutch release torque Tf. Therefore, the process proceeds to step S46 where the value that subtracted the comparatively small fixed value ΔTmt from the last motor torque target value Tmt (n−1) is set as the current motor torque target value Tmt(n) thereby making the reduction slope of the motor torque target value Tmt(n) less steep as shown in the graph (a) of FIG. 11.

By greatly changing the reduction slope of the motor torque target value Tmt(n) in this manner, the reduction slope of the armature current target value Iat is also suddenly made less steep as shown in the graph (g) of FIG. 11. As discussed above, however, setting the control gain K to the high responsive value $K_{P2}$ will result in the armature current Ia, output from the generator 7, following changes in the armature current target value Iat along with the high responsiveness without any undershoot and as shown in the graph (b) of FIG. 11, the actual motor torque will also be a value that follows the motor torque target value Tmt(n).

Thereafter, when the motor torque target value Tmt(n−1) reaches the clutch release torque Tf, the process proceeds from step S45 to step S47 in the clutch release process of FIG. 9, the count value $N_{CL}$ of the clutch release time measurement counter presets to a prescribed vale and then the brake pedal 41 is released. The process thereby proceeds to step S50 and the count value $N_{CL}$ is only set to the prescribed value. The process then proceeds to step S51 and after the count value $N_{CL}$ decrements the process proceeds to step S52 where the current motor torque target value Tmt(n) is set to the clutch release torque Tf as shown in the graph (a) of FIG. 11.

Thereafter, as shown in the graph (a) of FIG. 11, the motor torque target value Tmt(n) is maintained at the clutch release torque Tf during the time until the count value $N_{CL}$ reaches "0". While this clutch release torque Tf is being maintained, the clutch 12 is released at time t4 when the response delay time of the clutch 12 passes. At this time the actual motor torque is also maintained at the clutch release torque Tf as shown in the graph (b) of FIG. 11. Because of this, no shock occurs when the clutch 12 is actually released.

After this, if the count value $N_{CL}$ is "0" at time t5, the process proceeds from step S50 to step S53 in the processing of FIG. 10 and the motor torque target value Tmt(n) is set to "0". As a result, the armature current target value Iat is set to "0" in the process of step S26 of FIG. 8, the armature current Ia also changes to "0", and the generated voltage Vg is set to the motor induced voltage E. This changes the generated current of the generator 7 to "0" for stopping the drive of the electric motor 12.

According to the embodiment discussed above, since the control gain K of the control system of the armature current is set to a comparatively small normal value $K_{P1}$ in a drive state in which the motor torque target value Tmt(n−1) for the electric motor 4 is a value larger than the motor torque threshold value Th1, the armature current control that takes stability into consideration is achieved. Thereafter when the motor torque target value Tmt(n−1) is equal to or less than the motor torque threshold value Th1 and the motor torque target value Tmt undergoes reduction control to change over the control to two-wheel drive state, the control gain K is set to the high responsive value $K_{P2}$ that is a value larger than normal responsive value $K_{P1}$. Because of this, when changing to a state that maintains the motor torque target value Tmt(n) at the clutch release torque Tf from reduction control, the actual armature current Ia will follow along the high responsiveness with respect to the armature current target value Iat thereby making it possible reliably prevent the occurrence of undershoot which in turn allows the actual motor torque Tm generated by the electric motor 4 to reliably follow the motor torque target value Tmt(n) and then reliably prevent shock from occurring when releasing the electromagnetic clutch due to insufficient motor torque.

In this connection, when maintaining the control gain K at normal responsive value $K_{P1}$ at time t2 when the reduction slope of the motor torque target value Tmt(n) is made less steep as shown in the graph (h) of FIG. 11, the actual armature current Ia undershoots the armature current target value Iat, the motor torque Tm, generated by the electric motor 4, also drops in proportion to this undershoot and the value then falls below the clutch release torque Tf. If the clutch 12 is released in this undershoot state, it will not be possible to achieve a balanced acceleration between the clutch 12 on the motor side and the rear wheels due to insufficient torque and shock will occur. In this embodiment however, since the undershoot of the armature current Ia can be reliably presented as described above, the clutch 12 can be released without any shock occurring and no unusual sensations being transmitted to the passengers.

When the brake pedal 41 is stepped on creating a braking state when the motor torque target value Tmt(n−1) is equal to or less than the motor torque threshold value Th2 and control changes over to the torque reduction control in the clutch release process of FIG. 10, outputting the clutch release command will be prohibited and decrementing of the count value $N_{CL}$ of the clutch release time counter will be stopped with the clutch release torque in a maintained state. Because of this, the clutch can release and preventing shock from occurring can be reliably prevented when there is insufficient power generation of the generator 7 and the motor torque is not controlled reliably due to the engine rotational speed falling below the allowed amount while braking.

Furthermore, in the embodiment discussed above, the electric motor armature current control method, that controls the armature current of the electric motor 4, is driven by the main drive source (internal combustion engine 2) and has the generator 7, that supplies armature current to the electric motor 4. The control method comprised such that by using controlling the field current of the generator 7, the armature current to be output is controlled. Therefore, the surplus power generated by the generator 7 drives the electric motor 4 allowing the rear wheels 3L and 3R (subordinate drive wheels) to be driven making it possible to improve the acceleration properties of the vehicle.

Even further, in the embodiment discussed above, the electric motor armature current control method comprises an armature current detection method that detects the armature current of the electric motor 4, an armature current target value computation method that computes the armature current target value of the electric motor 4 and a generator output control method that multiplies a control gain by deviations between the armature current target value and the armature current to create field control signals of the generator 7 and then outputs the field control signals to the generator 7. The response characteristic variation method is comprised so as to maintain the control gain to an normal set value in a four-wheel drive state and then change to a larger high response set value compared to the normal set value when the main drive wheels change over to a two-wheel drive state. This composition implements armature current control that takes stability into consideration in a simultaneous drive state making it possible to control the armature current that takes stability into consideration when changing over to a drive state such as two-wheel drive and to achieve an optimum armature control in response to the drive state.

Even further, the composition includes the surplus torque computing section that computes the surplus torque of the main drive wheels and the electric motor torque computing section that computes the electric motor torque based on the surplus torque computed by the surplus torque computing section. The clutch release method is comprised so as to detect a traveling state in which the main drive wheels change over from a four-wheel drive state to a two-wheel drive state when the electric motor torque computed by the electric motor torque computing section drops to a value equal to or less than a set threshold value. Because of this, surplus torque that exceeds the road surface reactive force limit torque of the main drive wheels 1L, 1R drive the electric motor 4 thereby improving the energy efficiency and fuel consumption.

Here, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

This embodiment discussed a case when rotating the electric motor 4 by the generator 7 that is rotated by the internal combustion engine 2. However, the present invention is not limited to this method and can be applied to a case wherein electrical power is supplied to the electric motor 4 from a separate battery and an armature current control circuit is provided in this power supply path to control the armature current.

This embodiment also discussed a case when using the automatic transmission 5. Although the present invention is not limited to this method. A belt drive non-stage transmission or a toroidal type non-stage transmission can also be used.

Even further, this embodiment also discussed a case when so-called proportional (P) control was executed to compute the armature current control value Iap based on the control gain K and deviations between the armature current target value Iat and the armature current Ia although the present invention is not limited to this method. Proportional/integral control as shown in the Equation (13) below can also be used and differential control added to this.

$$Iap = (Iat - Ia)K + S(Iat - Ia)dt * Ki \tag{13}$$

Even further, this embodiment also discussed a case when computing the field generated voltage Vg of the generator 7 based on the armature current control value Iap and the induced voltage E and then controlling the field control output MF of the generator 7 although the present invention is not limited to this method. Computing the duty rate in proportion to the armature current control value Iap and then supplying a regulated generated output of this duty rate to the bipolar transistor 33 can also be done.

Even further, this embodiment also discussed a case when using the electromagnetic clutch as the clutch although the present invention is not limited to this method. A fluid-pressure clutch can also be used. For this case, the clutch engagement force can be controlled by using electrically controlling a pressure control valve that controls the fluid pressure supplied to the fluid-pressure clutch. Any type of other clutches that can electrically control the clutch linkage force can also be used.

Even further, this embodiment also discussed a case when the input shaft of the generator 7 was linked to the internal combustion engine 2 through a belt 6 although the present invention is not limited to this method. The input shaft of the generator 7 can be linked to a rotating part from the output side of the transfer case up until the front wheels 1L and 1R. For this case, the engine load when idling is also reduced.

Even further, this embodiment also discussed a case in which the motor rotational speed sensor 39 was used as a motor rotational speed detection method and directly detect the motor rotational speed Nm using this motor rotational speed sensor 39 but the invention is not limited to such a method. The motor rotational speed can be estimated based on the wheel speeds $V_{WRL}$ and $V_{WRR}$ detected by the wheel speed sensors 24RL and 24RR and the reduction ratio of the differential gear 13.

Even further, this embodiment discussed a case in which the change to a drive state is in proportion to the acceleration slippage of the front wheels but the invention is not limited to such a method. Changing to drive state can also be in proportion to the accelerator position opening degree.

In addition, this embodiment discussed a case in which the present invention was used in drive vehicle wherein the front wheels 1L and 1R are the main drive wheels and the rear wheels 3L and 3R are the subordinate drive wheels but the invention is not limited to such a method. The rear wheels 3L and 3R can be the main drive wheels and the front wheels 1L and 1R the subordinate drive wheels.

Even further, this embodiment discussed a case in which the present invention was used in a drive vehicle but the invention is not limited to such a method. The present invention can be used in vehicles comprising two or more wheels wherein a portion of the main drive wheel(s) are driven by an internal combustion engine and the remaining subordinate drive wheel(s) are driven by an electric motor. The present invention can also be used in electrically driven apparatuses which drive electric motors which drive wheels utilizing a generator that is rotated by another rotational drive source such as an internal combustion engine.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-159157. The entire disclosure of Japanese Patent Application No. 2002-259157 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus of a vehicle having an electric motor transmitting a drive torque to a first wheel, and a clutch installed between the electric motor and the first wheel, the vehicle driving force control apparatus comprising:

a clutch control section configured to control engagement and release of the clutch; and a motor control section configured to control a motor response characteristic of the electric motor to change a responsiveness of the electric motor to a control command by increasing the motor response characteristic of the electric motor from a first response characteristic to a second response characteristic when the clutch control section releases the clutch.

2. A vehicle driving force control apparatus of a vehicle having an electric motor transmitting a drive torque to a first wheel, and a clutch installed between the electric motor and the first wheel, the vehicle driving force control apparatus comprising:

a clutch control section configured to control engagement and release of the clutch; and a motor control section configured to control a motor response characteristic by increasing the motor response characteristic of the electric motor from a first response characteristic to a second response characteristic when the clutch control section releases the clutch, the motor control section being configured to control at least one of an armature current of the electric motor and a field current of the electric motor such that the motor response characteristic of the electric motor increases from the first response characteristic to the second response characteristic when the clutch control section releases the clutch.

3. A vehicle driving force control apparatus of a vehicle having an electric motor transmitting a drive torque to a first wheel, and a clutch installed between the electric motor and the first wheel, the vehicle driving force control apparatus comprising:

a clutch control section configured to control engagement and release of the clutch;

a motor control section configured to control a motor response characteristic by increasing the motor response characteristic of the electric motor from a first response characteristic to a second response characteristic when the clutch control section releases the clutch; and a main driving source configured to drive a second wheel that is not driven by the electric motor.

4. The vehicle driving force control apparatus as recited in claim 3, further comprising a mode selection section configured to select one of a multi-wheel drive mode in which both the first wheel and second wheel are driven and a non-all wheel drive mode in which the first wheel is not driven by the electric motor.

5. The vehicle driving force control apparatus as recited in claim 3, wherein the motor control section is configured to control at least one of an armature current of the electric motor and a field current of the electric motor such that the motor response characteristic of the electric motor increases from the first response characteristic to the second response characteristic when the clutch control section releases the clutch.

6. The vehicle driving force control apparatus as recited in claim 5, wherein the motor control section further configured to control the armature current of the electric motor by controlling a field current of a generator of the vehicle, the generator being driven by the main driving source to supply the armature current to the electric motor.

7. The vehicle driving force control apparatus as recited in claim 6, wherein the motor control section further including:

an armature current detection section configured to detect the armature current of the electric motor;

an armature current target value computation section configured to compute an armature current target value of the electric motor; and a generator output control section configured to multiply a control gain by a deviation between the armature current target value and the armature current to create a field control signal that is outputted to the generator; and the motor control section is further configured to change the control gain from a normal value for the clutch engaged mode to a high response value larger than normal responsive value, when the clutch engaged mode is switched to the clutch disengaged mode.

8. A vehicle driving force control apparatus of a vehicle having an electric motor transmitting a drive torque to a first wheel, and a clutch installed between the electric motor and the first wheel, the vehicle driving force control apparatus comprising:

a clutch control section configured to control engagement and release of the clutch;

a motor control section configured to control a motor response characteristic by increasing the motor response characteristic of the electric motor from a first response characteristic to a second response characteristic when the clutch control section releases the clutch;

a surplus torque computing section configured to compute a surplus torque of a second wheel driven by a main driving source independent of the clutch being engaged;

an electric motor torque computing section configured to compute an electric motor torque based on the surplus torque; and a mode selection section configured to select a multi-wheel drive mode when the electric motor torque is higher than a predetermined threshold value, and select a non-all wheel drive mode when the electric motor torque is equal to or lower than the predetermined threshold value.

9. The vehicle driving force control apparatus as recited in claim 8, wherein the motor control section being further configured to start increasing the motor response characteristic of the electric motor from the first response characteristic to the second response characteristic when the electric motor torque is equal to or lower than the predetermined threshold value.

10. The vehicle driving force control apparatus as recited in claim 8, wherein the main driving source is configured to drive a generator that supplies power to the electric motor.

11. The vehicle driving force control apparatus as recited in claim 10, wherein the main driving source is an internal combustion engine.

12. The vehicle driving force control apparatus as recited in claim 10, wherein the mode selection section is configured to select one of the multi-wheel drive mode in which both the first wheel and the second wheel are driven and the non-all wheel drive mode in which the first wheel is not driven by the electric motor.

13. The vehicle driving force control apparatus as recited in claim 12, wherein the motor control section is configured to control at least one of an armature current of the electric motor and a field current of the electric motor such that the motor response characteristic of the electric motor increases from the first response characteristic to the second response characteristic when the clutch control section releases the clutch.

14. The vehicle driving force control apparatus as recited in claim 12, wherein the motor control section further configured to control an armature current of the electric motor by controlling a field current of a generator of the vehicle, the generator being driven by the main driving source to supply the armature current to the electric motor.

15. The vehicle driving force control apparatus as recited in claim 14, wherein the motor control section further including:

an armature current detection section configured to detect the armature current of the electric motor;

an armature current target value computation section configured to compute an armature current target value of the electric motor; and a generator output control section configured to multiply a control gain by a deviation between the armature current target value and the armature current to create a field control signal that is outputted to the generator; and the motor control section is further configured to change the control gain from a normal value for a clutch engaged mode to a high response value larger than normal responsive value, when the clutch engaged mode is switched to a clutch disengaged mode.

16. The vehicle driving force control apparatus as recited in claim 4, further comprising a surplus torque computing section configured to compute a surplus torque of a second wheel driven by a main driving source independent of the clutch being engaged; and an electric motor torque computing section configured to compute an electric motor torque based on the surplus torque, the mode selection section being configured to select the multi-wheel drive mode when the electric motor torque is higher than a predetermined threshold value, and select the non-all wheel drive mode when the electric motor torque is equal to or lower than the predetermined threshold value.

17. The vehicle driving force control apparatus as recited in claim 15, wherein the mode selection section includes a switch to manually select one of the multi-wheel drive mode and the non-all wheel drive mode.

18. A vehicle driving force control apparatus of a vehicle having an electric motor transmitting a drive torque to a first wheel, and a clutch installed between the electric motor and the first wheel, the vehicle driving force control apparatus comprising:

clutch control means for controlling engagement and release of the clutch; and motor control means for controlling a motor response characteristic of the electric motor to change a responsiveness of the electric motor to a control command by increasing the motor response characteristic of the electric motor from a first response characteristic to a second response characteristic when the clutch control means releases the clutch.

* * * * *